United States Patent [19]

Leonardo

[11] Patent Number: 4,601,451

[45] Date of Patent: Jul. 22, 1986

[54] DUAL AMPLIFIER TAP BRACKET OR THE LIKE

[75] Inventor: Ignazio Leonardo, Mountainside, N.J.

[73] Assignee: Diamond Communication Products, Inc., Garwood, N.J.

[21] Appl. No.: 441,993

[22] Filed: Nov. 16, 1982

[51] Int. Cl.$^{4}$ .......................... H01R 7/08; F16L 3/08

[52] U.S. Cl. .............................. 248/74.1; 339/263 L; 339/246; 24/115 F; 24/569

[58] Field of Search .............................. 24/569, 115 F; 248/74 R; 339/263 R, 263 L, 243, 246

[56] References Cited

U.S. PATENT DOCUMENTS

| | | | |
|---|---|---|---|
| 1,389,587 | 9/1921 | Hilborn | 24/569 |
| 1,420,790 | 6/1922 | Varney | 339/263 L |
| 1,800,756 | 4/1931 | Sass | 24/115 F |
| 2,499,981 | 3/1950 | Strobel | 24/569 |
| 2,932,870 | 4/1960 | Williams | 339/246 |
| 3,041,574 | 6/1962 | Cornell, Jr. | 339/263 L |
| 3,330,516 | 7/1967 | Vincent | 248/74 R |
| 3,848,959 | 11/1974 | Parlato | 339/246 |
| 4,032,212 | 6/1977 | Faust et al. | 339/263 L |
| 4,050,771 | 9/1977 | Watson et al. | 339/263 R |
| 4,247,159 | 1/1981 | Fruchard | 339/246 |

*Primary Examiner*—Victor N. Sakran

*Attorney, Agent, or Firm*—Hopgood, Calimafde, Kalil, Blaustein & Judlowe

[57] ABSTRACT

The invention contemplates a two-piece cable-clamp and bracket assembly especially suited for messenger-wire or the like suspension of two TV amplifier units, line extenders or the like from a single point along the suspension wire. The assembly is configured for naturally balanced, loosely retained initial engagement to and suspension from the wire. Loose retention is by way of a nut and bolt, and the parts interengage to assure correct mutual orientation at all times, such that all aspects of assembly to, adjustment along, and final clamping involve only one-handed operation. The final clamped engagement to the wire assures keyed anti-rotational suspension from the wire.

14 Claims, 7 Drawing Figures

DUAL AMPLIFIER TAP BRACKET OR THE LIKE

BACKGROUND OF THE INVENTION

The invention relates to a clamp construction for application to a cable, as to a messenger wire for overhead suspension of CATV or telephone cabling and associated tap devices.

Existing devices of the character indicated, i.e., for messenger-wire suspension, along with CATV or telephone cabling, involve multiple parts, namely, separate jaw members which are initially loosely connected by a single nut-and-bolt fastener via apertures in the separate jaw members. And where a tap or other equipment suspension is required, a separate suitably formed bracket member is apertured at its upper end, for assembled retention by the clamp fastener, to be clamped by the fastener when the fastener is driven to squeeze the jaws to the messenger wire. Necessarily, multiple parts in loosely retained relation via a single unset nut-and-bolt fastener are clumsy and awkward to handle, especially when consideration is given to the precarious elevated ladder or other support required for installation or maintenance personnel to use such parts. And such difficulties are compounded for situations in which more than one amplifier, line extender or the like equipment is to be carried at the same point of messenger-wire suspension.

BRIEF STATEMENT OF THE INVENTION

It is an object of the invention to provide improved clamp and bracket structure of the character indicated.

It is a specific object to provide such structure of two integrally-formed pieces, aside from a single nut-and-bolt fastener to secure the same.

Another specific object is to provide such structure wherein the separate parts, when loosely retained by the nut-and-bolt fastener, are nevertheless so retained by their coacting formations as to be readily assembled to a messenger wire or the like cable, and to be securable thereto in a one-handed nut-tightening operation.

It is also a specific object to meet the above objects with a structure capable of suspending two TV-amplifiers, line-extenders or the like equipments from the same point along the messenger wire or cable.

It is a general object to meet the above objects with more simple, less expensive, and more readily usable structure than heretofore.

The invention achieves the foregoing objects in a two-piece construction wherein one of the pieces is a U-shaped bracket that is configurated for naturally balanced, loosely retained initial engagement to and suspension from a messenger wire or cable. The second piece is a clamp member, loosely retained by a single nut-and-bolt fastening to the bracket and in its correct orientation (1) for initial messenger-wire engagement, (2) for longitudinal positioning as desired along the messenger wire, and (3) for final anti-rotational clamping to the messenger wire - all as a succession one-handed and therefore inherently safe operations. Coacting formations of the clamp piece with respect to the bracket piece assure the correct orientation, even when the pieces are in loosely retained relation, prior to initial assembly to the messenger wire. The indicated balance occurs whether arms of the bracket piece are or are not preassembled to the amplifier, line-extender or the like units to be suspended by the bracket.

DETAILED DESCRIPTION

The invention will be illustratively described in detail in conjunction with the accompanying drawings, in which:

FIG. 1 is a perspective view of structure of the invention, in clamped relation to a messenger wire or the like;

Figure 1:
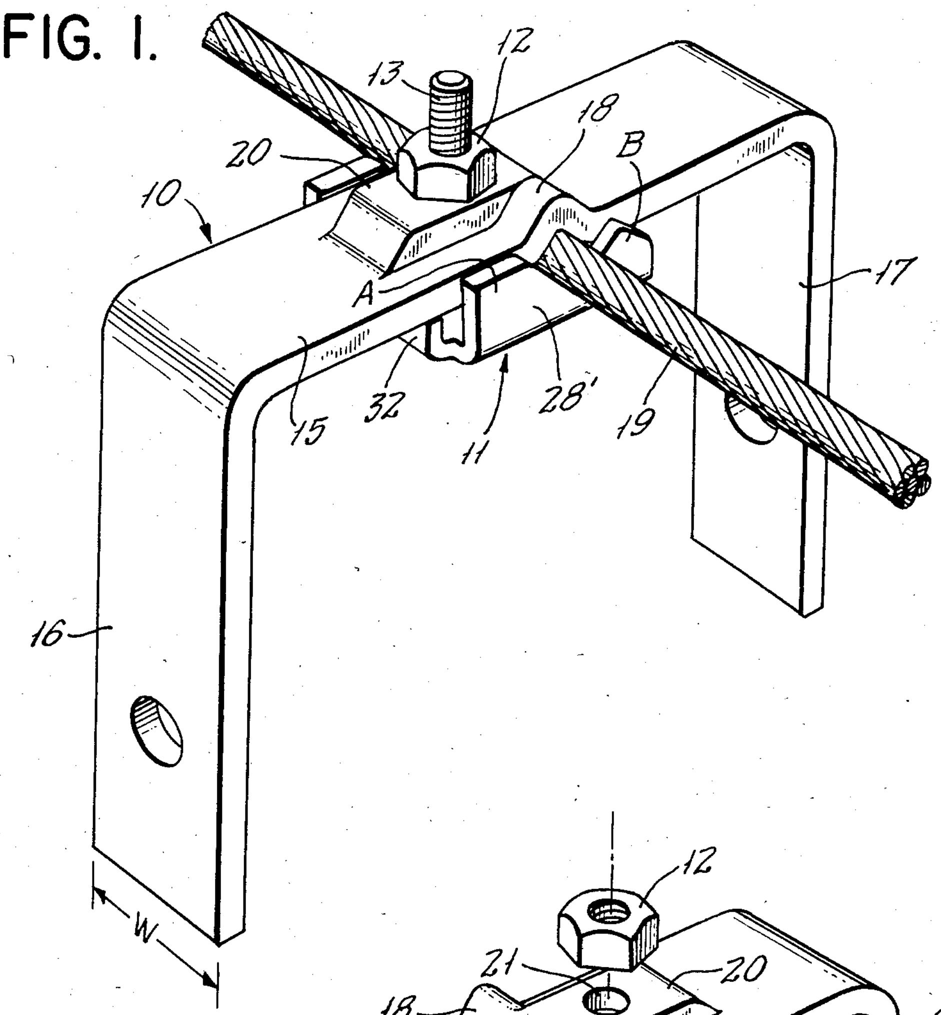
Figure 2:
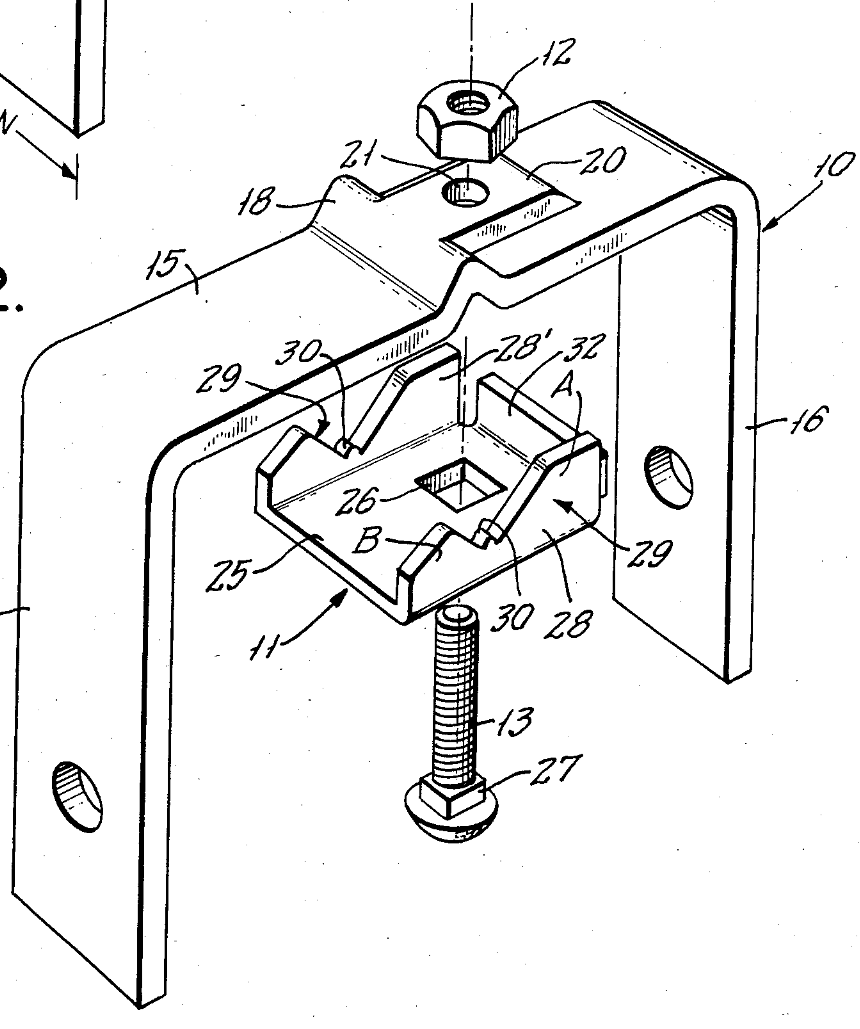
FIG. 2 is an exploded view in perspective to show separated parts of FIG. 1 structure, as viewed from an aspect 180-degrees reversed from that of FIG. 1.

The article of FIGS. 1 to 4 comprises a bracket piece 10 and a clamp piece 11, initially loosely retained to each other by a single nut 12 and bolt 13. Each of the pieces 10–11 is an integrally formed unit, preferably of steel. The bracket piece 10 is bent and formed from stiff strip material, of width W, and comprises a base panel 15, from the ends of which side panels 16 and 17 integrally depend; an aperture in each side panel will be understood to mount separate TV amplifier units, line-extender units or the like.

The center of base panel 15 is characterized by an upwardly formed rib 18, defining a groove by which to locate bracket piece 10 on a given messenger wire 19, in an initially balanced condition. Two parallel lanced slits within the body of panel 15 enable upwardly displaced deformation of a local region of adjacency to rib 18, establishing a platform 20, which is essentially tangent to the crest of rib 18 and parallel to the remainder of panel 15. The groove or concave section within rib 18 is of size selected preferably to accommodate and nest approximately one half the sectional area of the messenger-wire size intended for bracket installation. And the axis of a bolt aperture 21 in platform 20 is intentionally in close adjacency to the sectional profile of wire 19, when the nut and bolt have been tightened to set the clamp to the wire.

Figure 3:
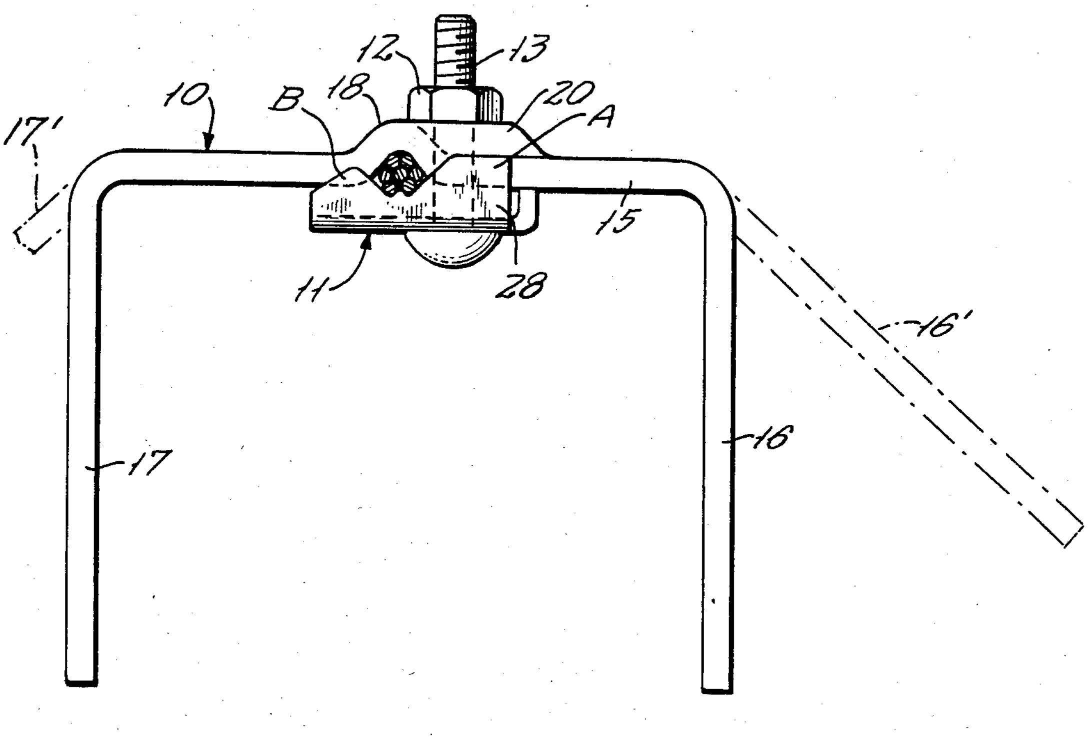
FIG. 3 is a side view of the structural parts of FIG. 1, in clamped condition.
Figure 5:
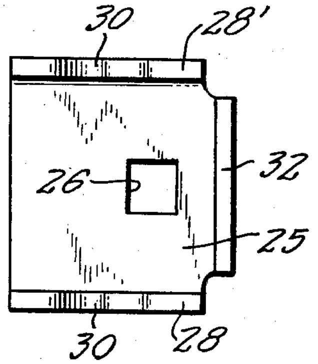
FIGS. 5, 6 and 7 are respectively plan, side-elevation, and rear-elevation views of the clamp member of FIG. 1.

The clamp piece 11 is also blanked and formed from stiff material. It comprises a base 25 with a bolt aperture 26 of square shape, for keyed accommodation of the square section 27 of bolt 13, suitably and preferably a carriage bolt. Opposite sidewalls 28–28′ are bent upward from base 25, at a spacing slightly greater than the width W of bracket piece 10. Sidewalls 28–28′ have matching upper contours, defining an upwardly open V-shape 29 at the same offset from aperture 26 as rib 18 is offset from aperture 21, and preferably a small protrusion 30 is provided in the wall contour, for anti-rotational ultimate engagement with wire 19. The sidewall contour (at A) on that side of the V-shape 29 which laps aperture 26 extends to greater height $H_1$ above base 25 than the height $H_2$ of the contour (at B) on the opposite side of the V-shape 29, but as shown in FIG. 3, in both cases such heights are sufficient to establish locked reception of bracket piece 10 between sidewalls 28–28′ and at both the A and B regions thereof.

Figure 7:
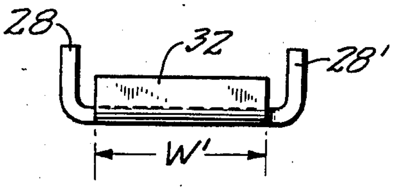

To complete the description of clamp member 11, an additional wall or lug formation 32 extends transversely, between side walls 28–28′; wall 32 is bent up from that end of base 25 which is nearer to aperture 26, and it is preferably at substantially the same offset to one side of aperture 26 as the alignment of V-groove bottoms (protrusions 30) is to the other side of aperture 26. As best seen in FIG. 7, wall 32 rises above base 25 to substantially the same extent $H_3$ as protrusions 30, and its transverse extent W' (FIG. 8) substantially matches the width W of bracket piece 10.

Figure 4:
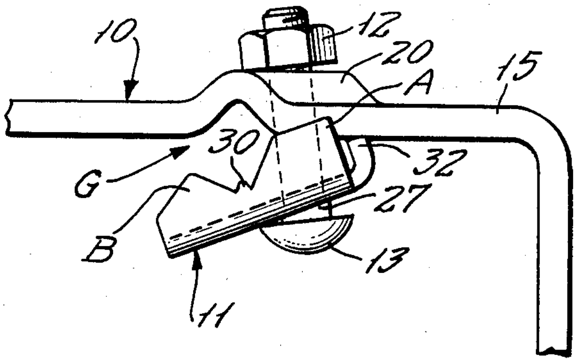
FIG. 4 is a fragmentary view from the aspect of FIG. 3 but showing the clamp-related parts in loosely retained condition, in readiness for initial assembly to a messenger wire.
Figure 6:
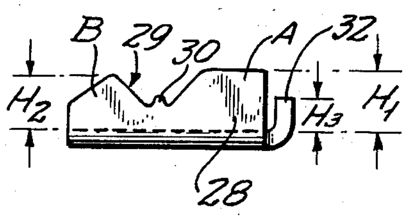

FIG. 4 illustrates the normal loosely retained relation of parts, in readiness for assembly to a messenger wire. To initially engage the wire 19, the loose assembly is first oriented with bracket base panel 15 above clamp member 11, allowing the latter to incline downwardly at an acute angle below panel 15. Bolt 13 is long enough to permit this, and the retained correct orientation of clamp member 11 about the bolt axis is attributable to the height $H_1$ of the spaced sidewall regions A, overlapping and spanning the width W of panel 15 at all times. The angle of downward tilt is gravitationally achieved against limiting stop reaction of wall 32 contact with the underside of panel 15, and bolt head contact with the underside of base 25. The axial extent of the square part 27 of the bolt is enough to hold a keyed relation to aperture 26, and looseness of the keyed relation is sufficient to permit the involved angular relation between bolt 13 and base 25. While all the above relationships are applicable for loose retention of the parts, the degree of looseness is such as to present a gap G characterized by convergent profiles, for acceptance of wire 19 at its initial insertion. This is a simple one-handed operation, following which nut 12 may be advanced by simple thumb and finger manipulation (another one-hand operation), to assure full entrapment of the fitting to the wire. Final wrenching to lock the fitting to the wire, with keying bite of protrusion 30 into the wire, is also a one-handed operation, performed only after the installer has the wire until satisfied as to correct longitudinal positioning of the bracket along the wire. As seen in FIG. 3, the final secured relation of parts achieves a substantially parallel offset of base 25 from panel 15, so that the bolt head and nut 12 seat on extensive flat surfaces, and there is a direct clamp-force overlap by part of the bolt head, over part of the cable.

The described structure will be seen to achieve all stated objects. The structure may be assembled to the messenger wire with equal one-handed ease, whether TV amplifier or the like units have been preassembled to the respective bracket arms or whether such assembly is made after bracket placement on the wire.

While the invention has been described in detail for a preferred form, it will be understood that modifications may be made without departing from the scope of the invention. For example, the side panels 16-17 may for certain purposes be other than perpendicular to base panel 15, as suggested by outwardly flaring phantom outlines 16'-17' in FIG. 3, all without sacrifice of the inherent self-stabilizing nature of the overall structure and its one-handed applicability to a messenger wire.

What is claimed is:

1. A suspension-cable fitting for clamped assembly to a longitudinally extending messenger wire or the like cable of given-diameter, comprising a unitary stiff metal bracket of generally U-shape formed from strip material, said bracket having a base panel with a separate side panel depending integrally from each end of said base panel, said base panel being characterized by a central upwardly displaced transverse rib of concave sectional span and depth to nest and locate substantially half the cross-section of the messenger wire or the like, whereby said bracket is self-stabilizing when so placed on the wire or cable as to receive the wire or cable in the concavity of the rib, a localized portion of said base panel adjacent said rib being displaced at offset from the rest of said base panel and to substantially the extent of offset at said rib, said localized portion having a bolt-receiving aperture on a vertical axis of alignment offset from the elongation axis of said rib; and a channel-shaped clamp member of formed stiff sheet material having a base and upstanding walls which are spaced to receive the width of said base panel therebetween, said base having a bolt-receiving aperture, and a bolt through both apertures, each of said side walls having an upwardly open generally V-shaped recess on the transverse alignment of wire or cable nesting in said rib.

2. The fitting of claim 1, in which said clamp member additionally includes an upstanding integral lug formation between said side walls and at offset from the bolt aperture of said clamp member, the latter offset being in the direction opposite to that of the traverse alignment of the V-shaped recesses.

3. The fitting of claim 2, in which the effective depth of said V-shaped recesses is substantially in excess of half said given diameter.

4. The fitting of claim 2, in which on the side of each V-shaped recess that is remote from said lug, each side wall is of lesser extent above said base than is the side-wall portion adjacent said lug.

5. The fitting of claim 2, in which on the side of each V-shaped recess that is remote from said lug, each side-wall slopes downward in the direction away from said lug.

6. The fittings of claim 1, in which the bottom of each V-shaped recess is characterized by an upstanding lug for anti-rotational engagement with stranded messenger wire or cable.

7. The fitting of claim 6, in which the effective height of said lug above said base is substantially half said given diameter.

8. The fitting of claim 6, in which the effective height of said lug above said base is less than the effective height of said side walls.

9. The fitting of claim 6, in which the effective height said lug above said base is such in relation to the spacing of the wire or cable reception in said V-shaped recesses that upon clamping a wire or cable between said bracket and clamp member and via said bolt, the plane of said base is substantially parallel to said base panel.

10. The fitting of claim 1, in which the displaced offset in said base panel is between two parallel slits offset within the lateral confines of said base panel, said slits extending substantially to the crest of said rib.

11. The fitting of claim 1, in which at least one of said apertures is square and said bolt has a square shank for square-aperture keying engagement.

12. The fitting of claim 11, in which the square aperture is in the base of said clamp member.

13. The fitting of claim 1, in which said side panels extend downwardly in substantially parallel relation, substantially perpendicular to said base panel.

14. The fitting of claim 1, in which said side panels are divergent in the downward direction from said base panel.

* * * * *